(12) United States Patent
Brouwer et al.

(10) Patent No.: US 10,526,571 B2
(45) Date of Patent: Jan. 7, 2020

(54) LIGHT-STABLE HOP EXTRACT

(71) Applicant: HEINEKEN SUPPLY CHAIN B.V., Zoeterwoude (NL)

(72) Inventors: Eric Richard Brouwer, Zoeterwoude (NL); Tinne Dekoninck, Zoeterwoude (NL); Nele Vanbeneden, Zoeterwoude (NL); Marcel Van Veen, Zoeterwoude (NL); Maria Elizabeth Wilhelmina Schouten, Zoeterwoude (NL)

(73) Assignee: Heineken Supply Chain B.V., Zoeterwoude (NL)

( * ) Notice: Subject to any disclaimer, the term of this patent is extended or adjusted under 35 U.S.C. 154(b) by 0 days.

(21) Appl. No.: 16/075,129

(22) PCT Filed: Feb. 3, 2017

(86) PCT No.: PCT/EP2017/052450
§ 371 (c)(1),
(2) Date: Aug. 2, 2018

(87) PCT Pub. No.: WO2017/134263
PCT Pub. Date: Aug. 10, 2017

(65) Prior Publication Data
US 2019/0040341 A1    Feb. 7, 2019

(30) Foreign Application Priority Data
Feb. 5, 2016   (EP) ..................................... 16154513

(51) Int. Cl.
*C12C 3/12* (2006.01)
*C12H 1/16* (2006.01)
*C12C 3/08* (2006.01)

(52) U.S. Cl.
CPC ............... *C12C 3/12* (2013.01); *C12H 1/165* (2013.01); *C12C 3/08* (2013.01)

(58) Field of Classification Search
CPC .................................. C12C 3/12; C12H 1/165
(Continued)

(56) References Cited

U.S. PATENT DOCUMENTS 3,044,879 A    7/1962  Kissel et al.
3,155,522 A   11/1964  Hildebrand et al.
(Continued)

FOREIGN PATENT DOCUMENTS

AU    7540281 A    3/1982
FR    2590589 A1   5/1987
(Continued)

OTHER PUBLICATIONS

STN search performed on May 16, 2019.*
(Continued)

*Primary Examiner* — Vera Stulii
(74) *Attorney, Agent, or Firm* — Gilberto M. Villacorta; Sunit Talapatra; Foley & Lardner LLP

(57) ABSTRACT

The invention relates to a light-stable hop extract comprising at least 1 g per kg of dry matter of one or more hop derived substances represented by formula (I), wherein R=—CH
(Continued)

(CH$_3$)$_2$, —CH(CH$_3$)CH$_2$CH$_3$ or —CH$_2$CH(CH$_3$)$_2$. The invention further relates to the use of the light-stable hop extract in beer and to a method of preparing such a hop extract.

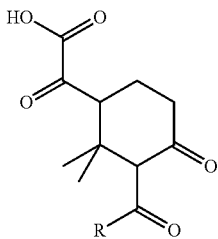

(I)

25 Claims, 4 Drawing Sheets

(58) Field of Classification Search
USPC .................................................. 426/600
See application file for complete search history.

(56) References Cited

U.S. PATENT DOCUMENTS

| 3,298,835 | A | 1/1967 | Hildebrand et al. |
| 3,615,660 | A | 10/1971 | Bavisotto et al. |
| 4,767,640 | A | 8/1988 | Goldstein et al. |
| 5,811,144 | A | 9/1998 | Bordeleau et al. |
| 2007/0116817 | A1* | 5/2007 | Van Der Ark ......... A23C 9/152 426/534 |

FOREIGN PATENT DOCUMENTS

| GB | 2 362 891 A | 12/2001 |
| JP | 2015-119645 A | 7/2015 |
| WO | WO-93/02177 A1 | 2/1993 |
| WO | WO-96/32465 A1 | 10/1996 |
| WO | WO-01/92459 A1 | 12/2001 |
| WO | WO-2006/104387 A1 | 10/2006 |
| WO | WO-2011/054838 A2 | 5/2011 |

OTHER PUBLICATIONS

Huvaere, K., et al., "Flavin-induced photodecomposition of sulfur-containing amino acids is decisive in the formation of beer lightstruck flavor", Photochem. Photobiol. Sci., 2006, 5:961-969.
International Search Report and Written Opinion in PCT/EP2017/052450, dated May 22, 2017, 10 pages.
Kipp & Zonen: Knowledge Center. "Solar Radiation", https://www.kippzonen.com/Knowledge-Center/Theoretical-info/Solar-Radiation, pp. 1-3. (Year: 2014).
Zufall et al. "The influence of hop products on beer flavour stability." Brewing Science—Monatsschr. Brauwiss 11.12 (2008): 113-120.

* cited by examiner

LIGHT-STABLE HOP EXTRACT

CROSS-REFERENCE TO RELATED APPLICATIONS

This application is the National Phase of International Patent Application No. PCT/EP2017/052450 filed Feb. 3, 2017, published Aug. 10, 2017 as WO 2017/134263 A1, which claims priority to European Patent Application No. 16154513.2 filed Feb. 5, 2016. The contents of these applications are herein incorporated by reference in their entirety.

TECHNICAL FIELD OF THE INVENTION

The present invention relates to light-stable hop extracts and to the application of such hop extracts in beer. The invention further provides a method of preparing such a light-stable hop extract, said method comprising illuminating a pre-isomerised hop extract.

BACKGROUND OF THE INVENTION

Hops are the female flowers of the hop plant *Humulus lupulus*. They are used as an ingredient in beer, to which they impart a bitter, tangy flavour. Hops are usually dried in an oast house before they are used in the brewing process. In the brewing process the wort (sugar-rich liquid produced from malt) is boiled with hops before it is cooled down and yeast is added, to start fermentation.

Boiling the wort with hops results in the extraction of alpha acids (humulones, such as humulone, adhumulone, cohumulone, posthumulone and prehumulone) into the sweet wort, which under the influence of temperature (thermal isomerisation) are partially isomerised to the corresponding iso-alpha acids (isohumulones). These iso-alpha acids are responsible for the characteristic bitter taste of hopped beer. Typical alpha acid levels in the wort at the start of the wort boiling are below 0.01 wt % (below 100 ppm). Disadvantages of this traditional hopping approach to impart bitterness are the inefficient alpha acid extraction and isomerisation, typically resulting in iso-alpha acid yields below 40%.

Hop utilization can be improved significantly by performing the alpha acid isomerisation outside the brewing process. To this end pre-isomerised hop products have been developed. These pre-isomerised hop product are produced starting from hop extract.

Hop extracts are usually obtained via liquid or supercritical carbon dioxide extraction. Carbon dioxide hop extracts provide predominantly alpha acids (humulones) next to beta acids (lupulones), and they can be further fractionated to obtain alpha acid enriched hop extracts. Starting from these alpha acid containing extracts, the "off-line" pre-isomerisation of alpha acids outside the brewing (wort boiling) process can be achieved using alkali metal and/or alkaline earth metal based compounds via two approaches. The first approach applies a solvent-free reaction medium while in the other approach the transformation is performed after addition of solvents, either pure water or alternatively water mixed with an organic solvent.

It is known to isomerise alpha acid to iso-alpha acids by means of photolysis. AU 7540281, for instance, describes a process for the up-grading of the bitter substances from hops, and more particularly of practically pure alpha- and beta acids obtained from a highly purified hop extract, particularly by treatment with liquid carbon dioxide, characterized in that the alpha and/or beta acids are subjected to photolysis by sunlight, for a predetermined duration, under conditions adapted to produce an optimum quantic yield under suitable temperature conditions, preferably close to 60° C., to obtain respectively iso-alpha acids and deoxy-alpha acids U.S. Pat. No. 4,767,640 describes a method of preparing light stable hop product that essentially consists of reduced isohumulones, and less than 0.5% unreduced isohumulones and non-isohumulones unstable products. Example 1 describes a process in which an isomerized hop extract was reduced, followed by acidification and separation of the aqueous layer and the oily layer. The oily extract so obtained contained 70% reduced isohumulone, 6.5% background material and less than 0.5% unreduced isohumulone. Example 3 describes how the oily extract was further purified to yield a "Post Purified Aqueous Phase" and a "Post Purified Oil Phase". Example 4 describes the chromatographic separation of the oily extract of Example 1 into three fractions.

Example 5 describes an experiment in which the light stability of the aforementioned purified extracts ("Post Purified Aqueous Phase" and a "Post Purified Oil Phase") and of the three chromatographic fractions was evaluated. This was done by adding these materials to beer and irradiating for 2 hours with 600 foot candles of fluorescent light.

WO 93/02177 describes a process for producing a foam stabilizing and bittering agent for a malt beverage characterized by extracting hops under conditions which favour the separation and recovery of a fraction rich in adprehumulone, and subjecting the adprehumulone fraction to photo-isomerisation to produce iso-adprehumulone.

It is well-known that the flavour quality of beer is compromised by exposure to light, a phenomenon which is generally referred to as 'lightstruck' or 'sunstruck' flavour, and which is triggered by light-induced degradation of iso-alpha acids.

The formal mechanism for formation of beer lightstruck flavour in model systems, composed of isohumulones, riboflavin, and cysteine, on exposure to visible light, has been suggested by Kuroiwa et al. already in 1963. Photo-excited riboflavin induces cleavage of isohumulones to a 4-methylpent-3-enoyl radical, which undergoes decarbonylation to a 3-methylbut-2-enyl radical. Trapping of this stabilized allyl radical by a thiol radical derived from cysteine leads to formation of 3-methylbut-2-ene-1-thiol (3-MBT), the substance responsible for lightstruck flavour. 3-MBT has an extremely low flavour threshold level of around or below 1 ppt.

In order for the formation of 3-MBT to occur in beer besides iso-alpha acids, the reaction requires light energy in the 300-550 nm range of the spectrum, a photosensitizer (e.g. riboflavin, i.e. vitamin B2), and a sulphur source (e.g. sulphur containing amino acid).

The photolytic degradation of iso-alpha acids occurs as a consequence of the presence of an iso-3-hexenoyl side chain in the iso-alpha acid molecules. By modifying the molecular structure of the iso-alpha acids, notably by reducing the C=C and/or C=O bonds in the iso-3-hexenoyl side chain, substantial 3-MBT formation in beer can be prevented.

Reduced iso-alpha acid derivatives that are commercially available contain dihydro-, tetrahydro- and/or hexahydro-iso-alpha acids, and are usually added after the primary fermentation stage of the brewing process. The dihydro-iso-alpha acids (also called rho-iso-alpha acids) are obtained by the reduction of the carbonyl group in the aforementioned iso-3-hexenoyl chain to a hydroxyl group, generally using alkali metal borohydride as the reducing agent. The tetrahydro-iso-alpha acids are obtained via hydrogenation of the C═C bonds in the aforementioned iso-3-hexenoyl side chain and the isopentenyl side chain. The hexahydro-iso-alpha acids are produced by combining the aforementioned reduction and hydrogenation processes.

There is a need for a pre-isomerised hop extract that is light-stable, i.e. that does not substantially contribute to the formation of 3-MBT in light-exposed beer, but that has not been chemically reduced/hydrogenated.

SUMMARY OF THE INVENTION

The inventors have unexpectedly discovered that light-stability of pre-isomerised hop extracts can be improved substantially by illuminating such hop extracts with sunlight. Although the inventors do not wish to be bound by theory, it is believed that as a result of this illumination iso-alpha acids undergo the same type of photolytic degradation that is responsible for the formation of 3-MBT in beer. However, in the absence of important reactants (such as thiol-containing substances), the reactive intermediate degradation products formed during illumination that would otherwise participate in the formation of 3-MBT, are converted into other reaction products that do not adversely affect the flavour or flavour stability of beer.

The illumination of pre-isomerised hop extract in accordance with the present invention greatly improves the light-stability of the hop extract, but surprisingly it has not more than a limited impact on the bitterness and desirable flavour characteristics of the hop extract.

The inventors have further discovered that during illumination of pre-isomerised hop extract substantial quantities of the following hop derived substances (including all isomers) are formed:

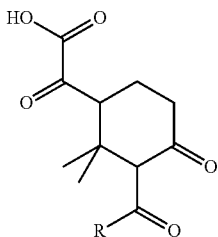

wherein R═—CH(CH$_3$)$_2$, —CH(CH$_3$)CH$_2$CH$_3$ or —CH$_2$CH(CH$_3$)$_2$.

These substances occur in conventional pre-isomerised hop extracts in not more than trace amounts. However, in the illuminated pre-isomerised hop extracts of the present invention they are present in significant concentration levels.

One aspect of the present invention relates to a light-stable hop extract comprising at least 1 g per kg of dry matter of one or more hop derived substances represented by the following formula (I):

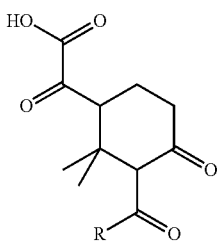

wherein R═—CH(CH$_3$)$_2$, —CH(CH$_3$)CH$_2$CH$_3$ or —CH$_2$CH(CH$_3$)$_2$.

Another aspect of the invention concerns a method of preparing a light-stable hop extract, said method comprising:
providing a pre-isomerised hop extract comprising at least 10% of iso-alpha acids by weight of dry matter, and
illuminating the pre-isomerised hop extract, optionally after dilution of the pre-isomerised hop extract.

The present invention also concerns a beer comprising light-stable hop extract, said beer containing at least 40 µg/l riboflavin and at least 0.1 mg/l of one or more hop derived substances represented by the following formula (I):

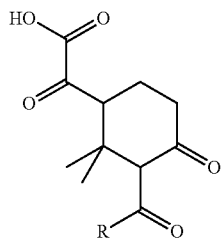

wherein R═—CH(CH$_3$)$_2$, —CH(CH$_3$)CH$_2$CH$_3$ or —CH$_2$CH(CH$_3$)$_2$.

DETAILED DESCRIPTION OF THE INVENTION

Figure 1:
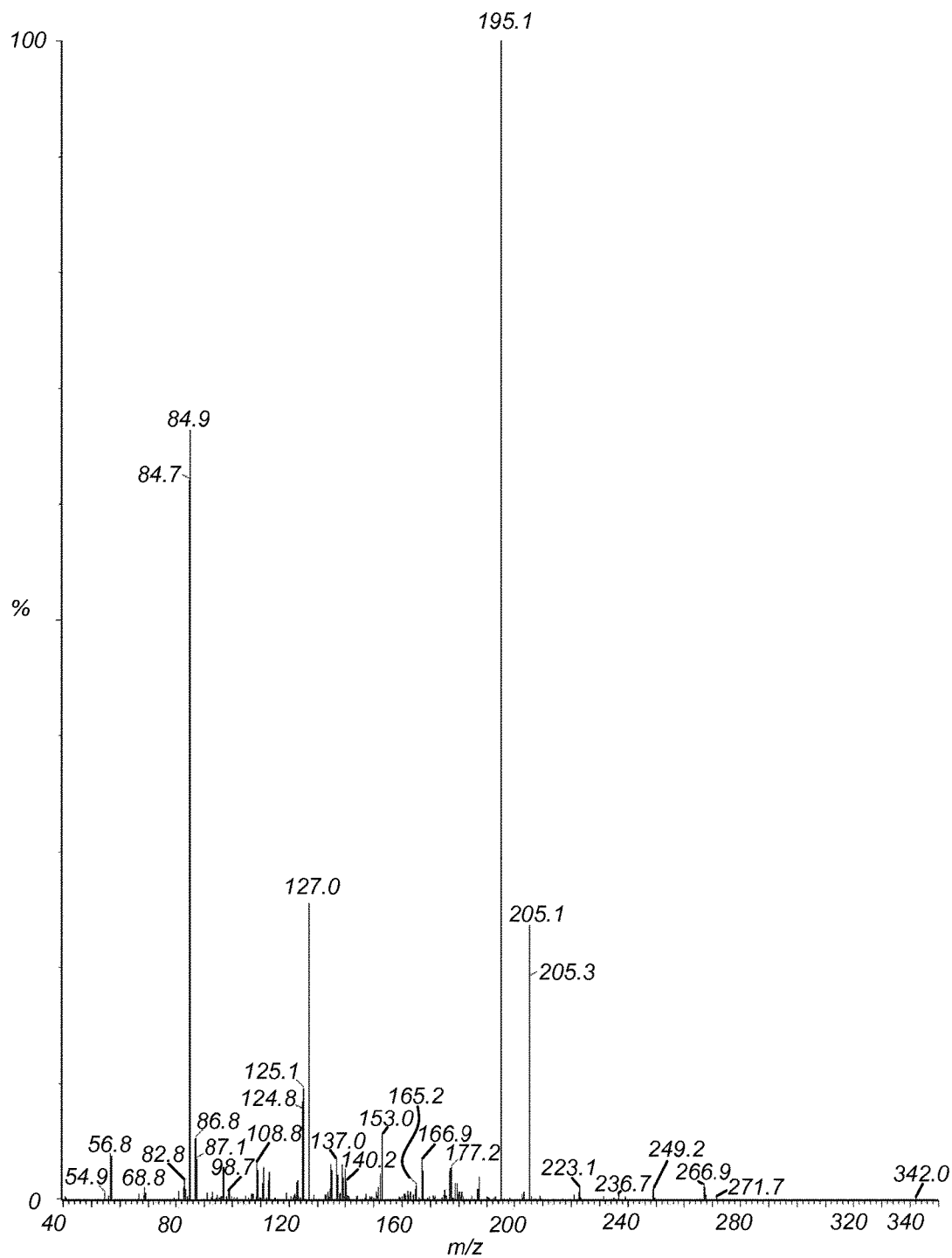
FIG. 1 shows the mass spectrum of the hop derived substance Co1.

Accordingly, a first aspect of the present invention relates to a light-stable hop extract comprising at least 1 g per kg of dry matter of one or more hop derived substances represented by the following formula (I):

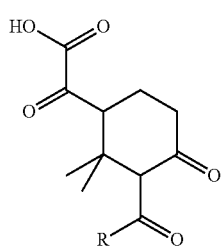

wherein R═—CH(CH$_3$)$_2$, —CH(CH$_3$)CH$_2$CH$_3$ or —CH$_2$CH(CH$_3$)$_2$.

The term "hop derived substances" as used herein, unless indicated otherwise, refers to substituted oxycyclohexyl substances represented by aforementioned formula (I). The aforementioned hop derived substances can occur in different isomeric forms. All these isomeric forms, including tautomers and stereo-isomeric forms are encompassed by the above mentioned definition "hop derived substances".

The term "iso-alpha acids" as used herein refers to substances selected from the group of isohumulone, isoadhumulone, isocohumulone, pre-isohumulone, post-isohumulone and combinations thereof. The term "iso-alpha acids" encompasses different stereo-isomers (cis-iso-alpha acids and trans-iso-alpha acids).

The term "alpha acids" as used herein refers to substances selected from the group of humulone, adhumulone, cohumulone, prehumulone, posthumulone and combinations thereof.

The term "beta acids" as used herein refers to substances selected from the group of lupulone, adlupulone, colupulone, prelupulone, and postlupulone and combinations thereof.

The term "isohumulone derived substance" as used herein refers to hop derived substances as defined above, wherein $R=\!\!-CH_2CH(CH_3)_2$.

The term "isocohumulone derived substance" as used herein refers to hop derived substances as defined above, wherein $R=\!\!-CH(CH_3)_2$.

The term "beer" as used herein encompasses both alcohol-containing and alcohol-free beer.

The concentration of the hop derived substances in a hop extract or in beer can suitably be determined by means of LC-MS, using the methodology that is described in this document.

The light-stable hop extract of the present invention typically contains the hop derived substances in a concentration of at least 3 g per kg of dry matter, more preferably in a concentration of at least 6 g per kg of dry matter and most preferably of at least 10 g per kg of dry matter. Typically, the hop extract contains not more than 350 g, preferably not more than 250 g of the hop derived substances per kg of dry matter.

According to a preferred embodiment of the present invention, the light-stable hop extract contains significant amounts of one or more hop derived substances according to formula (I) in which $R=\!\!-CH(CH_3)_2$. This hop derived substance is believed to originate from isocohumulone and is referred to herein as isocohumulone derived substance. Typically, the light-stable hop extract contains the isocohumulone derived substance in a concentration of at least 0.3 g per kg of dry matter, more preferably in a concentration of at least 1 g per kg of dry matter and most preferably of at least 3 g per kg of dry matter.

As explained below, the inventors have identified two isocohumulone derived substances in the light-stable hop extract of the present invention. These two isocohumulone derived substances, referred to as Co1 and Co2, are described in more detail below. Typically, the light-stable hop extract contains the isocohumulone derived substance Co2 in a concentration of at least 0.2 g per kg of dry matter, more preferably in a concentration of at least 0.7 g per kg of dry matter and most preferably of at least 2 g per kg of dry matter.

According to a further preferred embodiment of the present invention, the light-stable hop extract contains significant amounts of one or more hop derived substances according to formula (I) in which $R=\!\!-CH_2CH(CH_3)_2$. This hop derived substance is believed to originate from isohumulone and is referred to herein as isohumulone derived substance. Typically, the light-stable hop extract contains the isohumulone derived substance in a concentration at least 0.5 g per kg of dry matter, more preferably in a concentration of at least 2 g per kg of dry matter and most preferably of at least 5 g per kg of dry matter.

The light-stable hop extract of the present invention typically contains at least 1%, more preferably at least 2% and most preferably at least 3% of iso-alpha acids by weight of dry matter.

According to a particularly preferred embodiment of the present invention the light-stable hop extract contains the hop derived substances in a concentration of at least 1%, more preferably at least 3%, even more preferably at least 5%, yet more preferably at least 10% and most preferably at least 20% by weight of the iso-alpha acids that are contained in the extract.

Typically, the light-stable hop extract contains at least 0.3%, more preferably at least 3% and most preferably at least 6% of the isocohumulone derived substance by weight of the iso-alpha acids that are contained in the extract.

The light-stable hop extract preferably contains at least 0.5%, more preferably at least 5% and most preferably at least 10% of the isohumulone derived substance by weight of the iso-alpha acids that are contained in the extract.

Alpha acids are typically contained in the light-stable hop extract in a concentration of 0-10%, more preferably of 0-3% and most preferably of 0.01-2% by weight of dry matter.

The light-stable hop extract of the present invention typically contains 0-10% beta acids by weight of dry matter, more preferably 0-5% beta acids by weight of dry matter.

The amount of reduced iso-alpha acids (dihydro-iso-alpha acids, tetrahydro-iso-alpha acids and hexahydro-iso-alpha acids) in the light-stable hop extract preferably does not exceed 10% by weight of the iso-alpha acids. Even more preferably the amount of reduced iso-alpha acids does not exceed 3% by weight of the iso-alpha acids.

The light-stable hop extract of the present invention typically comprises at least 20 mg/l of the hop derived substances. More preferably, the light-stable hop extract contains at least 80 mg/l of the hop derived substances, most preferably at least 150 mg/l of said hop derived substances.

The light-stable hop extract preferably is a hop extract that has been isolated from hop by means of extraction of with liquid or supercritical carbon dioxide.

The light-stable hop extract of the present invention preferably is a pre-isomerised hop extract, more preferably a pre-isomerised hop extract containing iso-alpha acids and alpha acids in a weight ratio that exceeds 10:1, most preferably in a weight ratio that exceeds 20:1.

The light-stable hop extract preferably has a water content of at least 30 wt. %, more preferably a water content of at least 50 wt. % and most preferably of at least 70 wt. %.

Another aspect of the present invention relates to a beer comprising light-stable hop extract, said beer containing at least 40 µg/l riboflavin and at least 0.1 mg/l of one or more hop derived substances represented by the following formula (I):

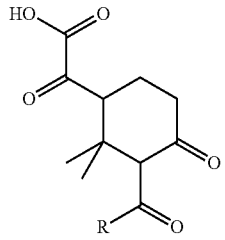

wherein R=—CH(CH₃)₂, —CH(CH₃)CH₂CH₃ or —CH₂CH(CH₃)₂.

As explained herein before, riboflavin plays an important role in the light-induced formation of 3-MBT in beer. Riboflavin is naturally present in beer and undergoes extremely rapid photolysis. As a matter of fact, in ordinary beer riboflavin is photolysed much more rapidly than iso-alpha acids. Thus, in light-struck beer riboflavin content is usually reduced to only a fraction of the original content even before a significant fraction of the iso-alpha acids has been photolysed.

The light-stable beer of the present invention differs from ordinary beer in that it contains at least 0.1 mg/l of the aforementioned one or more hop derived substances. This light-stable beer differs from light-struck beer in that it simultaneously contains at least 0.1 mg/l of these hop derived substances and at least 40 µg/l riboflavin.

The beer of the present invention typically contains at least 0.2 mg/l, more preferably at least 0.4 mg/l, and even more preferably at least 1 mg/l of the one or more hop derived substances. Typically the concentration of the one or more photolysed hop substances in the beer does not exceed 50 mg/l. More preferably said concentration does not exceed 40 mg/l, even more preferably it does not exceed 30 mg/l and most preferably it does not exceed 20 mg/l.

The light-stable beer preferably contains at least 0.03 mg/l, more preferably at least 0.1 mg/l and most preferably at least 0.3 mg/l of the isocohumulone derived substance.

The isocohumulone derived substance Co2 is preferably contained in the light-stable beer in a concentration of at least 0.02 mg/l, more preferably at least 0.07 mg/l and most preferably of at least 0.2 mg/l.

The light-stable beer preferably contains at least 0.05 mg/l, more preferably at least 0.2 mg/l and most preferably at least 0.5 mg/l of the isohumulone derived substance.

The riboflavin content of the light-stable beer preferably is at least 60 µg/l. Most preferably, the riboflavin content is in the range of 80 to 2,000 µg/l.

According to a particularly preferred embodiment, the one or more hop derived substances and riboflavin are present in the light-stable beer in a weight ratio that does not exceed 200:1, more preferably in a weight ratio that is in the range of 1:1 to 100:1 and most preferably in the range of 2:1 to 50:1.

The light-stable beer typically contains the isocohumulone derived substance and riboflavin in a weight ratio that does not exceed 100:1, more preferably in a weight ratio of 1:2 to 50:1, most preferably of 1:1 to 40:1.

The light-stable beer typically contains the isohumulone derived substance and riboflavin in a weight ratio that does not exceed 160:1, more preferably in a weight ratio of 1:1 to 80:1, most preferably of 2:1 to 60:1.

The light-stable beer of the present invention typically contains at least 0.1 mg/l, more preferably at least 0.3 mg/l, even more preferably at least 0.6 mg/l and most preferably at least 1 mg/l of iso-alpha acids. Typically the level of iso-alpha acids in the beer will not exceed 30 mg/l.

The one or more hop derived substances are preferably contained in the light-stable beer in a concentration of at least 1%, more preferably of at least 3%, even more preferably at least 5% and most preferably of at least 10% by weight of the iso-alpha acids that are also contained in the beer.

The light-stable beer of the present invention typically contains less than 100 ng/l 3-methyl-2-butene-1-thiol (3-MBT). Even more preferably the 3-MBT content is less than 50 ng/l, most preferably less than 30 ng/l. The concentration of 3-MBT can suitably be determined by means of the method described by Hughes et al. (Hughes P. S., Burke S. and Meacham A. E. (1997) "Aspects of the lightstruck character of beer". Institute of Brewing, Proceedings of the 6th Central and South Africa Section, pp. 123-128).

A further aspect of the present invention relates to a process of preparing a beer as defined herein before, said process comprising introducing a light-stable hop extract as defined herein before.

The light-stable hop extract is preferably added to wort or beer before clarification, i.e. before removal of entrained solids and yeast from the fermented beer. Typically, clarification of fermented beer is achieved by means of filtration.

In the aforementioned process the light-stable hop extract is preferably introduced into the wort or beer in a concentration of at least 2 mg/l, more preferably in a concentration of 5-200 mg/l, most preferably in a concentration of 10-150 mg/l.

Following addition of the light-stable hop extract to the wort, the wort is subjected to further processing steps, including:
  fermenting the wort with the help of brewer's yeast;
  clarifying the fermented beer; and
  packaging.

Finally, the present invention provides a method of preparing a light-stable hop extract, said method comprising:
  providing a pre-isomerised hop extract comprising at least 10%, preferably at least 20% and most preferably at least 40% of iso-alpha acids by weight of dry matter,
  illuminating the pre-isomerised hop extract, optionally after dilution of the pre-isomerised hop extract, to obtain a light-stable hop extract as defined herein before.

According to a particularly preferred embodiment, the pre-isomerised hop extract is illuminated with light having a maximum intensity at a wavelength in the range of 200-800 nm, more preferably in the range of 250-600 nm, most preferably of 300-500 nm.

The illumination intensity employed in the present process preferably exceeds 50 W/m². More preferably, said illumination intensity exceeds 100 W/m², most preferably it exceeds 200 W/m².

The pre-isomerised hop extract is typically illuminated with the aforementioned illumination intensity for at least 30 minutes, more preferably for at least 1 hour and most preferably for 2-48 hours.

During illumination the temperature of the hop extract typically remains within the range of 0-100° C., more preferably of 15-80° C.

The inventors have found that particularly good results can be obtained if the pre-isomerised hop extract is exposed to illumination after being diluted with water. Accordingly, in accordance with a particularly preferred embodiment, the present method comprises the steps of:
  diluting the pre-isomerised extract with water to produce an aqueous solution; and
  illuminating an aqueous solution of the pre-isomerised hop extract.

The aqueous diluted solution of the pre-isomerised hop extract typically has an iso-alpha acid content in the range of 0.2-200 g/l, more preferably of 0.5-70 g/l and most preferably 1-25 g/l when the illuminations starts.

The aqueous diluted solution of the pre-isomerised hop extract typically contains at least 80 wt. % water. Even more preferably said dilution contains at least 90 wt. % water. Most preferably, at least 95 wt. % water.

The invention is further illustrated by the following non-limiting examples.

EXAMPLES

Method of Determining the Concentration of Hop Derived Substances

The concentrations of 4 different hop derived substances represented by formula (I) can be determined by means of UPLC-MS using the procedure described below. These 4 hop derived substances include two isocohumulone derived substances (referred to as Co1 and Co2) and two isohumulone derived substance (referred to as N1 and N2). Typical retention times of these substances in the UPLC-MS method described below are listed below.

| Substance | Retention time (min.) |
| --- | --- |
| Co1 | 6.87 |
| Co2 | 7.99 |
| N1 | 9.08 |
| N2 | 9.99 |

Figure 2:
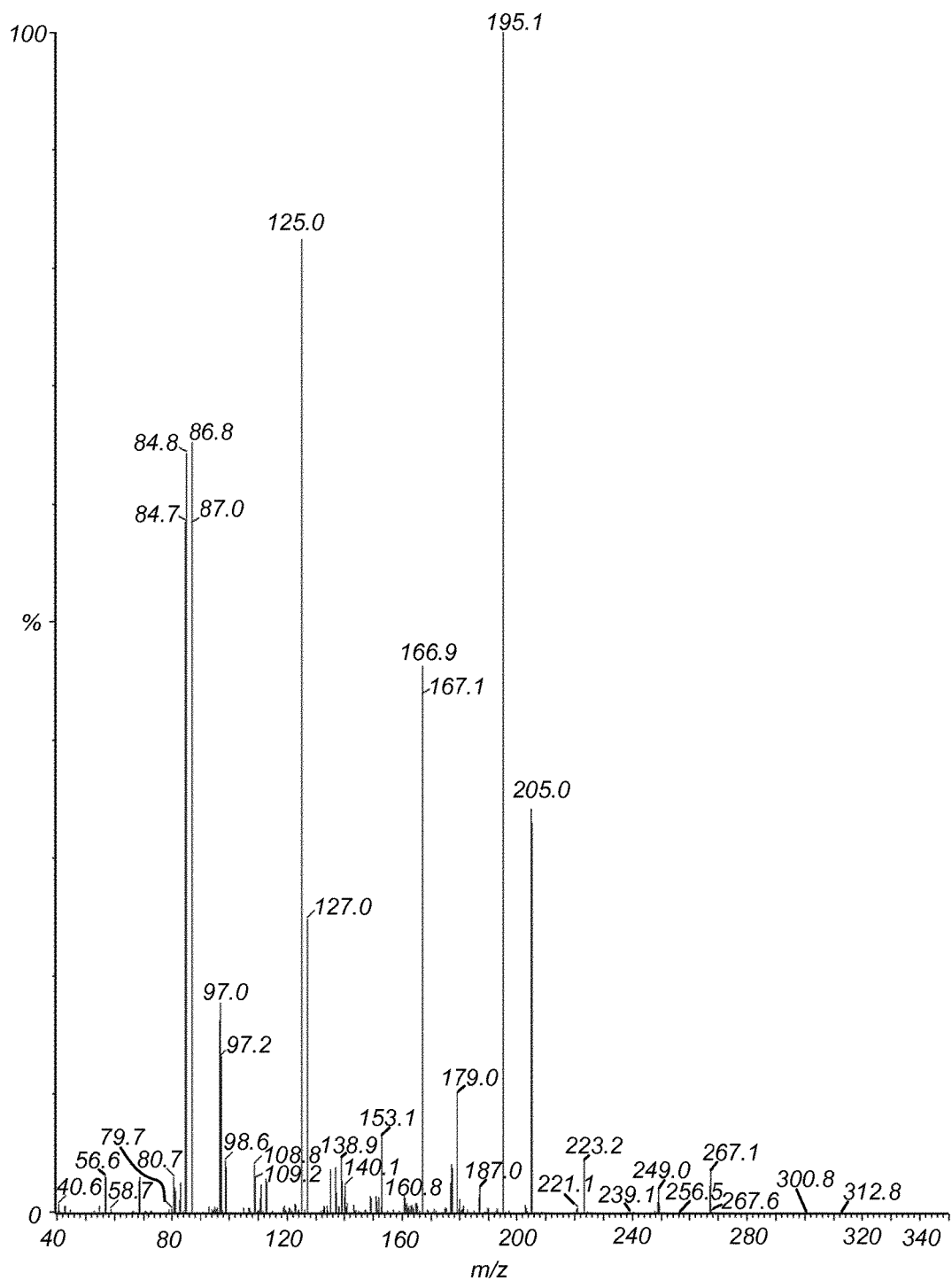
FIG. 2 shows the mass spectrum of the hop derived substance Co2.
Figure 3:
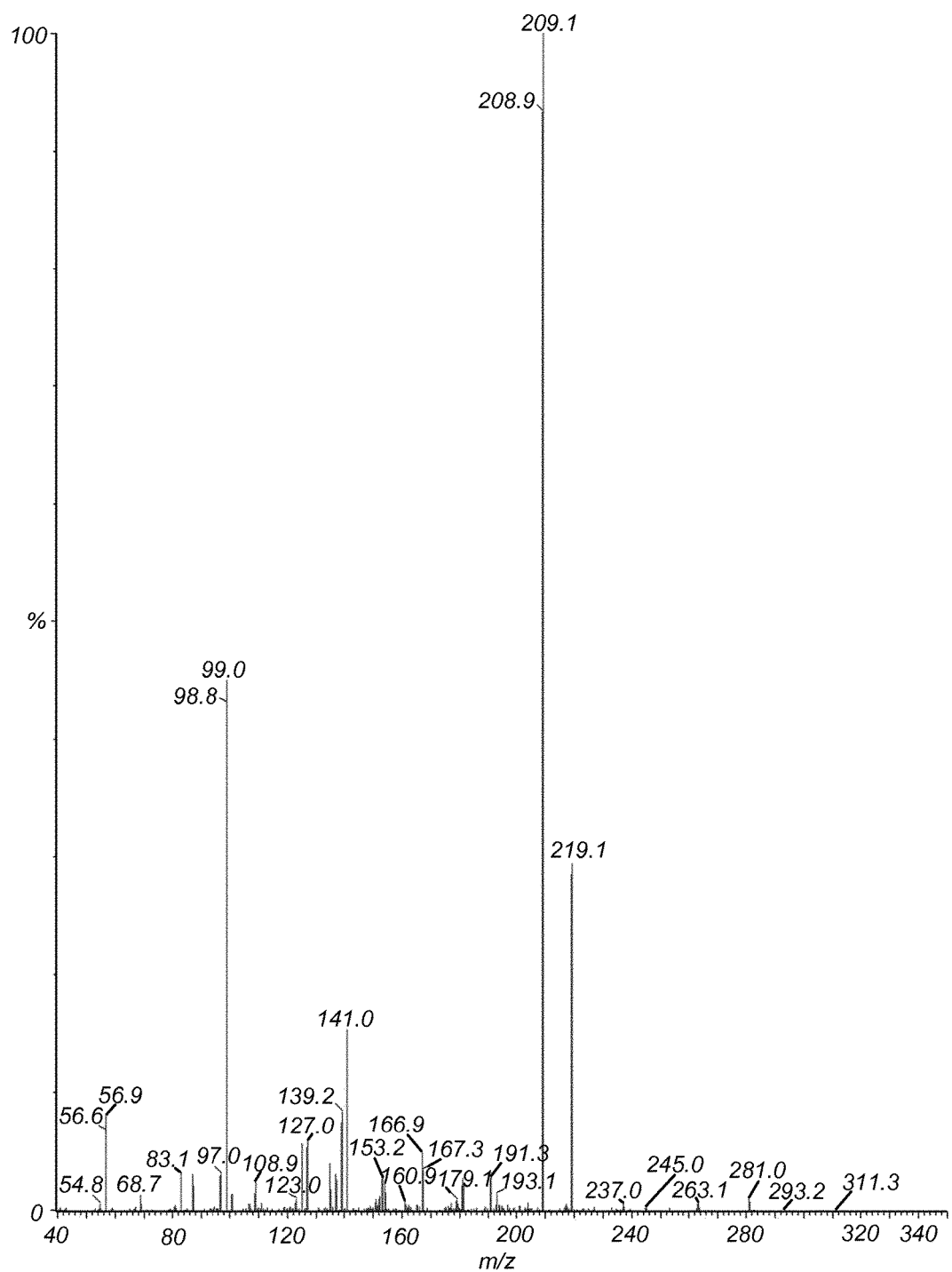
FIG. 3 shows the mass spectrum of the hop derived substance N1.
Figure 4:
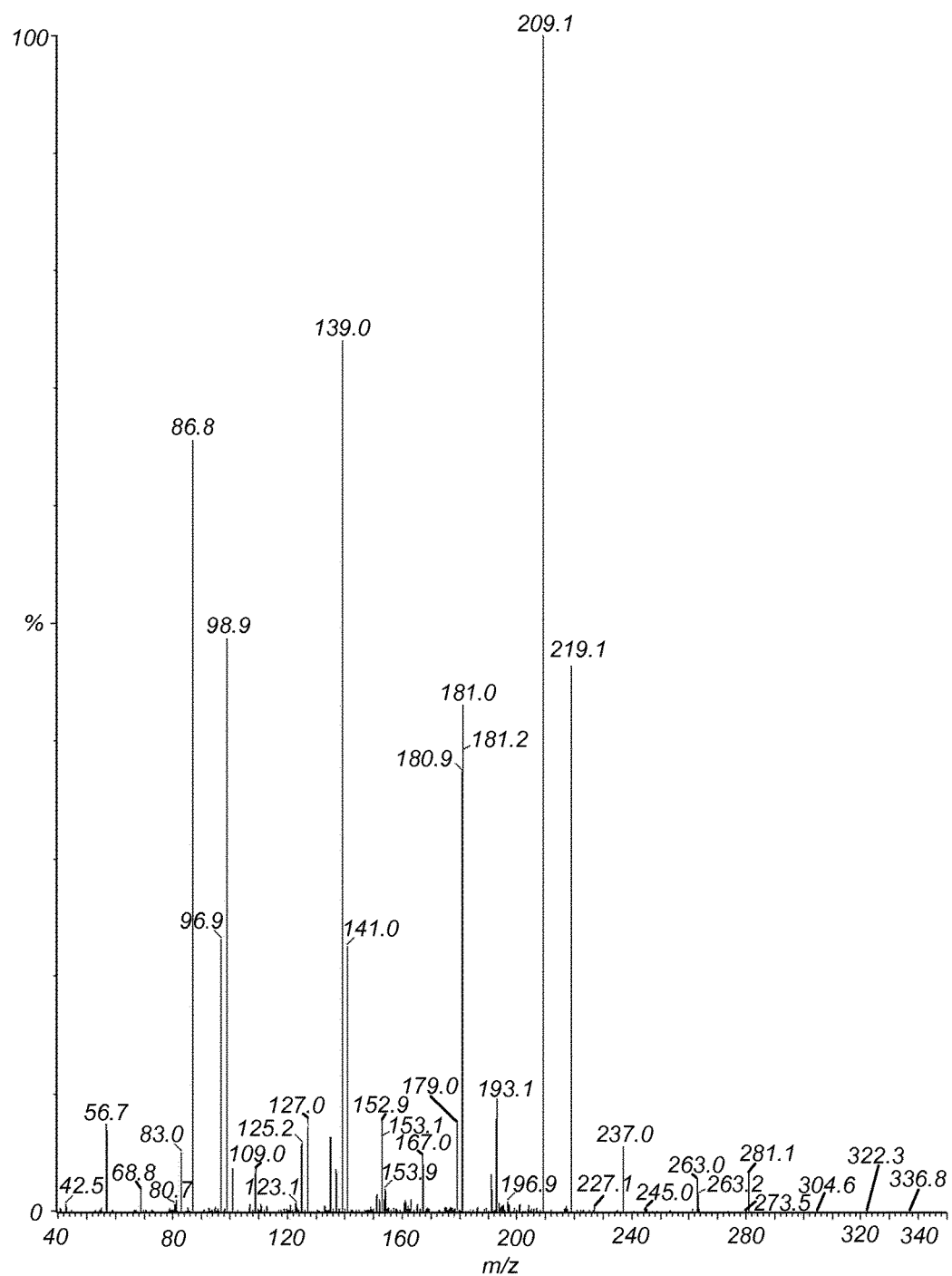
FIG. 4 shows the mass spectrum of the hop derived substance N2.

The mass spectra of these hop derived substances are shown in FIGS. 1-4.

The concentration of each hop derived substance is determined on the basis of calibration curves for each of the hop derived substances. These hop derived substances can be isolated in highly pure form from illuminated pre-isomerised hop extract by means of preparative UPLC.

The calibration curves for the hop derived substances are determined using the detector conditions described below.

The equipment, materials and conditions described below can be used to determine the concentrations of the aforementioned hop derived substances.

Equipment:
UPLC system: Acquity UPLC (Waters) equipped with a BEH C18 column (1.7 µm, 2.1 mm×150 mm; Waters product number: 186002353)
Detector: XEVO TQ-S mass spectrometer (Waters)
Chemicals:
Milli-Q® Ultrapure Water
Acetonitrile ≥99.9% (JT-Baker: 9853-02)
Formic acid ≥98% (Sigma-Aldrich product number: 33015)
UPLC Instrument Conditions:
Column temperature: 60° C.
Injection volume: 1 µL
Sample temperature: 10° C.
Run time: 25 min
Eluent A=1000 mL Ultrapure water+1 mL formic acid
Eluent B=1000 mL acetonitrile+1 mL formic acid
Gradient:

| Time (min) | Flow (mL/min) | % A | % B |
| --- | --- | --- | --- |
| 0.0 | 0.25 | 95 | 5 |
| 10 | 0.25 | 59 | 41 |
| 11 | 0.25 | 95 | 5 |
| 25 | 0.25 | 95 | 5 |

Detector Conditions:
Analytical method is set-up in negative scan mode (ES−) and Multiple Reaction Monitoring (MRM) modes.

MS Settings:

| | |
| --- | --- |
| Polarity | ES− |
| Capilllary (kV) | 2.5 |
| Source Temperature (° C.) | 150 |
| Desolvation temperature (° C.) | 600 |
| Cone gas flow (L/Hr) | 150 |
| Desolvation gas flow (L/Hr) | 1000 |
| Collision gas flow (mL/min) | 0.22 |

Multiple Reaction Monitoring (MRM) Modes:

| | Parent (m/z) | Daughter (m/z) | Coll (eV) |
| --- | --- | --- | --- |
| Co1 and Co2 | 267 | 195 | 20 |
| N1 and N2 | 281 | 209 | 20 |

Samples are degassed prior to analysis.

Method of Determining the Concentration of Riboflavin

The concentration of riboflavin in beer can be determined by means of UPLC-FLR using equipment, materials and conditions as described below.

Equipment:
UPLC system: Acquity UPLC (Waters) equipped with a BEH C18 column (1.7 µm, 2.1 mm×150 mm; Waters product number: 186002353)
Detector: Acquity Fluorescence (FLR) detector (Waters)
Chemicals:
Milli-Q® Ultrapure Water
Acetonitrile ≥99.9% (Sigma Aldrich product number: 34998)
Phosphoric acid ≥85.0% (Sigma Aldrich product number: 30417)
Riboflavin (Sigma Aldrich product number: R-7649)
Sodium dihydrogen phosphate monohydrate (Merck product number: 106346)
pH buffer 2.7 (7.5 g sodium dihydrogen phosphate monohydrate in 200 mL Ultrapure water+1 mL Phosphoric acid in 1000 mL Ultrapure water)
UPLC Instrument Conditions:
Column temperature: 40° C.
Injection volume: 10 µL
Sample temperature: 10° C.
Run time: 15 min
Eluens A=pH buffer 2.7
Eluens B=acetonitrile
Gradient:

| Time (min) | Flow (mL/min) | % A | % B |
| --- | --- | --- | --- |
| 0.00 | 0.20 | 95 | 5 |
| 10.0 | 0.20 | 95 | 5 |
| 10.5 | 0.20 | 15 | 85 |
| 12.0 | 0.20 | 15 | 85 |
| 12.2 | 0.20 | 95 | 5 |
| 15.0 | 0.20 | 95 | 5 |

Detector Conditions:
$\lambda_{ex}$=444 nm
$\lambda_{em}$=525 nm
Samples are degassed prior to analysis.

Example 1

A pre-isomerised hop extract (so-called 'Isohop' obtained from Barth-Haas Group) was used as a starting material. This hop extract had the following characteristics (according to the product description sheet from Barth-Haas Group):

contains 30±0.5 wt % iso-alpha acids contains <0.7% alpha acids contains <0.3% beta acids The pre-isomerised hop extract was diluted with 'Milli-Q® Ultrapure Water' (1:50 w/w). 16 mL of the diluted hop extract was introduced into a glass tube with screw cap (Duran glass, tube diameter is 16 mm, tube length is 160 mm). 30 of these glass tubes were simultaneously illuminated for a period of 32 hours inside a Suntest XLS+ device (ATLAS), using a Xenon lamp. During illumination, the following conditions were applicable:

Power of Xenon lamp is 1700 W

Tubes were horizontally positioned inside the Suntest XLS+ device

Distance between glass tubes and lamp is 25 cm

Amount of irradiance at sample level was set at 765 W/m$^2$

Temperature of diluted hop extract increases from ambient to circa 50° C. (no cooling nor heating was intentionally applied during illumination)

Before and after illumination, the concentrations of iso-alpha acids and hop derived substances in the hop extract were determined. Determination of iso-alpha acids in the hop extract was performed according to the method described by the European Brewery Convention (EBC) in 2005: 'Method 7.8: Iso-alpha-, alpha- and beta-acids in hops, hop powder products and hop extracts (HPLC method)'. Determination of the concentration of the hop derived substances in the extract was performed according to the method described above. The results of these analyses are shown in Table 2:

TABLE 2

|  | Iso-alpha acids (mg/L) | Hop derived substances | | | | |
| --- | --- | --- | --- | --- | --- | --- |
|  |  | Co1 (mg/L) | Co2 (mg/L) | N1 (mg/L) | N2 (mg/L) | Sum (mg/L) |
| Hop Extract | 5808 | <0.01 | <0.01 | <0.01 | <0.01 | <0.01 |
| Light-Stable Hop Extract | 339 | 65 | 264 | 174 | 372 | 875 |

Example 2

The illuminated and non-illuminated hop extracts of Example 1 were added to unhopped beer (300 mL unhopped beer in green bottle). A first beer (reference beer) was prepared by adding 20 mg/L of the non-illuminated hop extract. A second beer (light-stable beer) was prepared by adding 60 mg/L of the illuminated hop extract. The illuminated hop extract was applied in a higher concentration in order to compensate for the loss in bitter intensity that had occurred as a result of the illumination. The flavour profile of the beer containing the illuminated hop extract had a flavour profile that was very similar to that of the beer containing the non-illuminated hop extract.

Both beers were exposed to artificial sunlight by putting the bottles horizontally in the Suntest XLS+ device and illuminating them for a period of 24 hours. During illumination, the same conditions were applied as in Example 1.

Before and during exposure to the artificial sunlight the concentrations of the following substances were determined in both beers:

the hop derived substances of formula (I), iso-alpha acids, riboflavin, and

3-MBT.

Determination of iso-alpha acids in beer was performed according to the method described by the American Society of Brewing Chemists (ASBC) in 2009 (Methods of Analysis, 14th Edition): 'Method Beer 23 (section E: Iso-alpha acids in beer by HPLC)'. The 3-MBT content was determined using the method described by Hughes et al. ('Aspects of the lightstruck character of beer'. Institute of Brewing, Proceedings of the 6$^{th}$ Central and South Africa Section (1997), pp. 123-128). Determination of the concentration of the hop derived substances and riboflavin in beer was performed according to the methods described above.

The results of these analyses are summarised in Table 3:

TABLE 3

|  | Iso-alpha acids (mg/L) | Hop derived substances | | | | | Riboflavin (µg/L) | MBT (ng/L) |
| --- | --- | --- | --- | --- | --- | --- | --- | --- |
|  |  | Co1 (mg/L) | Co2 (mg/L) | N1 (mg/L) | N2 (mg/L) | Sum (mg/L) |  |  |
| Reference beer | | | | | | | | |
| 0 h illumination | 19.2 | <0.01 | <0.01 | <0.01 | <0.01 | <0.01 | 318 | 7 |
| 2 h illumination | 18.8 | 0.01 | 0.02 | 0.03 | 0.04 | 0.11 | 16 | 309 |
| 6 h illumination | 17.8 | 0.05 | 0.08 | 0.11 | 0.15 | 0.39 | 2.8 | 660 |
| 24 h illumination | 16.0 | 0.19 | 0.28 | 0.42 | 0.54 | 1.42 | 0.3 | 2072 |
| Light-stable beer | | | | | | | | |
| 0 h illumination | 4.5 | 0.53 | 2.32 | 1.65 | 3.54 | 8.04 | 313 | 8 |
| 2 h illumination | 4.4 | 0.56 | 2.29 | 1.66 | 3.45 | 7.95 | 15 | 74 |
| 6 h illumination | 4.2 | 0.61 | 2.20 | 1.77 | 3.29 | 7.87 | 2.0 | 137 |
| 24 h illumination | 3.6 | 0.86 | 2.19 | 2.18 | 3.18 | 8.41 | 0.4 | 506 |

The invention claimed is:

1. A beer comprising light-stable hop extract, the beer comprising at least 40 μg/l riboflavin and at least 0.1 mg/l of one or more hop derived substances represented by formula (I):

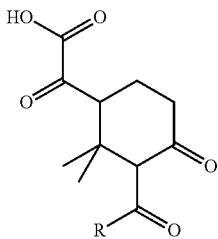

wherein R=—CH(CH$_3$)$_2$, —CH(CH$_3$)CH$_2$CH$_3$ or —CH$_2$CH(CH$_3$)$_2$.

2. The beer according to claim 1, wherein the beer comprises at least 0.2 mg/l of the one or more hop derived substances.

3. The beer according to claim 2, wherein the beer comprises at least 0.4 mg/l of the one or more hop derived substances.

4. The beer according to claim 3, wherein the beer comprises at least 1 mg/l of the one or more hop derived substances.

5. The beer according to claim 1, wherein the beer comprises not more than 50 mg/l of the one or more hop derived substances.

6. The beer according to claim 1, wherein the beer comprises at least 60 μg/l of riboflavin.

7. The beer according to claim 1, wherein the one or more hop derived substances and riboflavin are present in a weight ratio that does not exceed 200:1.

8. The beer according to claim 7, wherein the one or more hop derived substances and riboflavin are present in a weight ratio that is in the range of 1:1 to 100:1.

9. The beer according to claim 1, wherein the beer comprises at least 0.1 mg/l of iso-alpha acids.

10. The beer according to claim 9, wherein the beer comprises at least 0.3 mg/l of iso-alpha acids.

11. The beer according to claim 10, wherein the beer comprises at least 0.6 mg/l of iso-alpha acids.

12. The beer according to claim 9, wherein the beer comprises at least 1% by weight of the iso-alpha acids of the hop derived substances.

13. The beer according to claim 12, wherein the beer comprises at least 3% by weight of the iso-alpha acids of the hop derived substances.

14. The beer according to claim 13, wherein the beer comprises at least 5% by weight of the iso-alpha acids of the hop derived substances.

15. A light-stable hop extract comprising at least 1 g per kg of dry matter of one or more hop derived substances represented by the following formula (I):

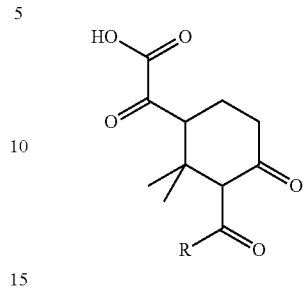

wherein R=—CH(CH$_3$)$_2$, —CH(CH$_3$)CH$_2$CH$_3$ or —CH$_2$CH(CH$_3$)$_2$.

16. The hop extract according to claim 15, wherein the hop extract comprises the one or more hop derived substances in a concentration of at least 3 g per kg of dry matter.

17. The hop extract according to claim 16, wherein the hop extract comprises the one or more hop derived substances in a concentration of at least 6 g per kg of dry matter.

18. The hop extract according to claim 17, wherein the hop extract comprises the one or more hop derived substances in a concentration of at least 10 g per kg of dry matter.

19. The hop extract according to claim 15, wherein the hop extract comprises at least 1% by weight of the iso-alpha acids of the one or more hop derived substances.

20. The hop extract according to claim 19, wherein the hop extract comprises at least 3% by weight of the iso-alpha acids of the one or more hop derived substances.

21. The hop extract according to claim 15, wherein the hop extract comprises at least 1% of iso-alpha acids by weight of dry matter.

22. The hop extract according to claim 15, wherein the hop extract comprises alpha-acids in a concentration of 0-10% by weight of dry matter.

23. The hop extract according to claim 15, wherein the hop extract comprises beta-acids in a concentration of 0-10% by weight of dry matter.

24. The hop extract according to claim 15, wherein the hop extract comprises reduced iso-alpha acids in a concentration that does not exceed 10% by weight of the iso-alpha acids; the reduced iso-alpha acids being selected from the group consisting of dihydro-iso-alpha acids, tetrahydro-iso-alpha acids, hexahydro-iso-alpha acids and combinations thereof.

25. A process of preparing a beer, comprising introducing a hop extract according to claim 15 to the beer.

* * * * *